US008887751B2

(12) United States Patent
Cadeo et al.

(10) Patent No.: US 8,887,751 B2
(45) Date of Patent: Nov. 18, 2014

(54) SYSTEM AND METHOD FOR CONTINUOUSLY PRODUCING A LIQUID MIXTURE

(75) Inventors: Angelo Cadeo, Oftringen (CH); Thomas Eggler, Rothrist (CH)

(73) Assignee: Miteco AG, Zofingen (CH)

( * ) Notice: Subject to any disclaimer, the term of this patent is extended or adjusted under 35 U.S.C. 154(b) by 558 days.

(21) Appl. No.: 13/380,125

(22) PCT Filed: Jun. 24, 2009

(86) PCT No.: PCT/CH2009/000217
§ 371 (c)(1),
(2), (4) Date: Mar. 2, 2012

(87) PCT Pub. No.: WO2010/148521
PCT Pub. Date: Dec. 29, 2010

(65) Prior Publication Data
US 2012/0160330 A1     Jun. 28, 2012

(51) Int. Cl.
| G05D 11/00 | (2006.01) |
| F17D 1/00 | (2006.01) |
| F17D 3/00 | (2006.01) |
| A23L 2/00 | (2006.01) |
| B01F 15/02 | (2006.01) |
| G05D 11/13 | (2006.01) |

(52) U.S. Cl.
CPC ................................ *G05D 11/132* (2013.01)
USPC ................. 137/92; 137/3; 137/12.5; 366/136

(58) Field of Classification Search
USPC ............. 137/3, 4, 12.5, 209, 92, 88; 222/394, 222/399; 366/136, 137, 132, 152.1, 152.2, 366/182.2
See application file for complete search history.

(56) References Cited

U.S. PATENT DOCUMENTS

| 3,298,383 A | * | 1/1967 | Cooper .............................. 137/3 |
| 4,320,775 A | * | 3/1982 | Stirling et al. .................... 137/3 |

(Continued)

FOREIGN PATENT DOCUMENTS

| EP | 0 334 213 | 9/1989 |
| WO | WO 99/48387 | 9/1999 |

OTHER PUBLICATIONS

International Search Report of PCT/CH2009/000217, date of mailing Nov. 12, 2010.

(Continued)

*Primary Examiner* — Elizabeth Houston
*Assistant Examiner* — Michael R Reid
(74) *Attorney, Agent, or Firm* — Collard & Roe, P.C.

(57) ABSTRACT

The invention relates to a system (30) for continuously producing a liquid product (P) comprising at least two liquid components (k1, k2) that can be pumped, wherein the system comprises two storage tanks (1a, 1b) for each component (k1, k2), two mass-flow control circuits (2a, 2b) for the storage tanks (1a, 1b) for establishing a target mass flow of the component (k1, k2), a first line (9a) into which the components of the liquid product (P) are fed, a second line (9b) for feeding in carbon dioxide, and a filling tank (1c), wherein the first line (9a) feeds the liquid product (P) mixed with carbon dioxide into the filling tank (1c), wherein the storage tanks (1a, 1b) and the filling tank (1c) are designed as pressure vessels and are interconnected by means of at least one pressure equalization line (1) for establishing a pressure equalization between the storage tanks (1a, 1b) and the filling tank (1c).

18 Claims, 1 Drawing Sheet

(56) References Cited

U.S. PATENT DOCUMENTS

| | | | |
|---|---|---|---|
| 4,560,089 A * | 12/1985 | McMillin et al. | 222/14 |
| 4,964,732 A | 10/1990 | Cadeo et al. | |
| 6,047,719 A | 4/2000 | Ruther et al. | |
| 6,280,075 B1 | 8/2001 | Cadeo | |
| 6,464,385 B2 * | 10/2002 | Akimoto et al. | 366/131 |
| 6,719,921 B2 * | 4/2004 | Steinberger et al. | 252/186.42 |

OTHER PUBLICATIONS

English Translation of International Preliminary Report on Patentability and Written Opinion of the International Searching Authority in PCT/CH2009/000217, dated Jan. 17, 2012.

* cited by examiner

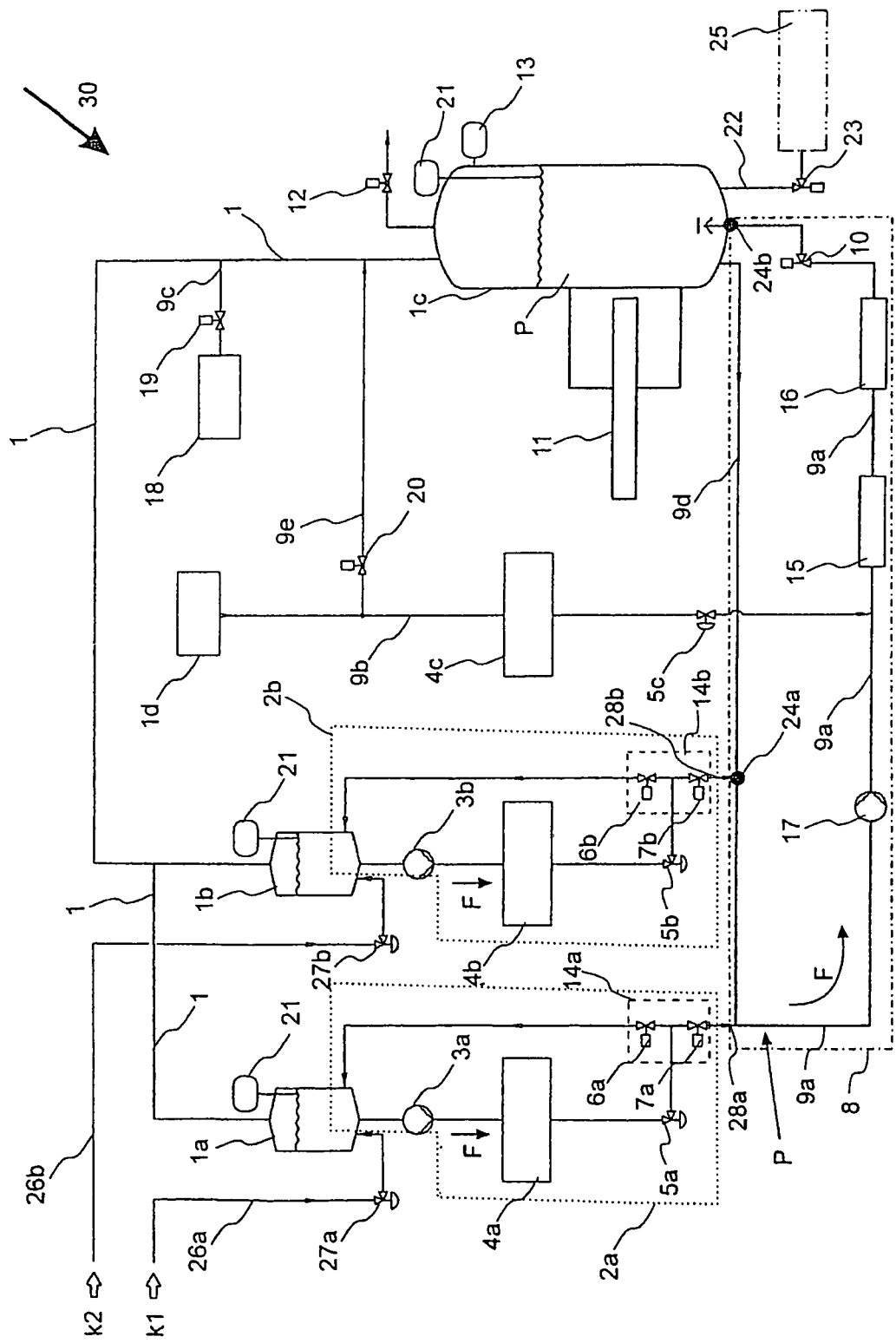

SYSTEM AND METHOD FOR CONTINUOUSLY PRODUCING A LIQUID MIXTURE

CROSS REFERENCE TO RELATED APPLICATIONS

This application is the National Stage of PCT/CH2009/000217 filed on Jun. 24, 2009, the disclosure of which is incorporated by references. The international application under PCT article 21(2) was not published in English.

TECHNICAL FIELD

The invention relates to a system for continuously producing a liquid product consisting of at least one, particularly at least two, liquid components that can be pumped, with a first and a second storage tank for each component and a first or a second mass-flow control circuit, respectively, attributed to the first and the second storage tank for establishing a target mass-flow of the component and a method for operating the system, according to the preambles of the independent claims.

PRIOR ART

Devices and methods offering solutions for producing a liquid product consisting of one or more components are known in the field of liquid product production. Tasks of such systems or methods respectively include the provision of the components, the mixing of these components and the supply of the mixed liquid product to systems for further processing. Typically, a step of further processing is the filling of the liquid product in containers provided for this purpose. For example, in the food industry a variety of refreshing beverages, milk-containing products, etc. are mixed by means of such systems.

Additionally to the provision of a beverage which may e.g. consist of syrup concentrate and water, in many cases there is a requirement to additionally add carbon dioxide to the beverage, like e.g. Coca Cola®, Pepsi Cola® etc. A further requirement is the possibility to produce different liquid products at the same time in the same system.

In order to satisfy these requirements the systems for producing the liquid products have to be designed as flexible as possible.

From the patent application WO 99/48387 it is known how to produce a food mixture out of at least two different mixture components. For this, such mixture components which are used for a plurality of food mixtures are stored in a single system entity and supplied from there in preparation of the desired food mixtures. By supplying the common component to a plurality of production lines a saving of storage tanks, measurement devices and regulating devices and pipe lines is reached.

The patent application EP 0334213 A discloses a method for continuously producing a fluid mixture, in case of which the components of the mixture to be produced are each fed back into their storage tanks in a closed circuit until a target mass-flow of each component is reached, whereafter the components can be mixed without having to wait for a stabilizing process of a regulating circuit of the mixture. The advantage of said solution is that the mixture has a required quality immediately after the switching from feedback operation into the mixing operation and therefore no stabilizing process is necessary, as compared to other systems in case of which the stabilizing process has to be carried out and in case of which the mixture has to be disposed of during this process.

For example, when carbon dioxide is added, the mixture produced by means of the above mentioned method is collected in an intermediary tank, passed on and provided with carbon dioxide. After that, the finished liquid product is fed into a filling tank, taken out of it for bottling and passed to a filling device.

Filling devices are subject to the stop-go principle, meaning that different amounts of the liquid product are withdrawn non-continuously. The stop-go operation is the result of malfunctions of other system entities of the production chain, like filler, labelling machine, etc. Because of this, the system for providing the liquid product has to be able to provide the mixture containing carbon dioxide in case of arbitrary amounts of liquid to be withdrawn over an arbitrary period of time.

DISCLOSURE OF THE INVENTION

It is an objective of the present invention to provide a system by means of which a more stable adjustment of the regulating circuit of the mixture can be reached, by means of which costs can be reduced during the mixing of liquid components with adding carbon dioxide and by means of which maintenance of the system is simplified. It is a further purpose of the invention to provide a method for operating such a system.

This objective is solved with a system of the type mentioned at the beginning by forming the storage tanks and the filling tank as pressure tanks and interconnecting them by means of at least one pressure equalization line for equalizing the pressure between the storage tanks and the filling tank. The storage tanks and the filling tank form together with the pressure equalization line a pressure equalization system.

Furthermore, a method for continuously producing a liquid product consisting of at least two components and carbon dioxide by using the system according to the invention is claimed. During operation of the system, continuous pressure equalization between the storage tanks and the filling tank is carried out by means of the pressure equalization line.

Thus, according to the claims, a system and a method with a pressure equalization function between the storage tanks and the filling tank are provided. By this, the path of conventional solutions, which are based on the usage of storage tanks and intermediary tanks being under atmospheric pressure and filling tanks being under elevated pressure, in case of which approach high pressure differences between the intermediary tank and the filling tank arise, is abandoned. For example, in case of known solutions, the pressure difference between the intermediary tank and the filling tank is up to 7 bar. In case of the present solution the regulation of the liquid amount is simpler because of a substantially equal pressure between the storage tanks and the filling tank. High pressure fluctuations between the filling tank and the lines/sections supplying the liquid, particularly arising because of the stop-go operation of the filling device, are substantially eliminated by means of the system according to the invention during operation with the method according to the invention.

SHORT DESCRIPTION OF THE DRAWINGS

The FIGURE shows schematics of the system according to the invention with associated components and their connections.

WAYS OF CARRYING OUT THE INVENTION

Further advantageous embodiments of the invention result from the dependent claims and the examples described in the following by means of the FIGURE.

The FIGURE shows schematics of a preferred embodiment of the system 30 according to the invention with associated components and their connections. Two liquid components k1, k2 are each fed into a storage tank 1a, 1b via a first and a second supply line 26a, 26b. The components may e.g. be a syrup consisting of 60% sugar and 40% fruit juice and water, wherein the mixture consists e.g. of 20% syrup and 80% water. The amount of the components is regulated depending on a liquid level in the storage tanks 1a, 1b by means of a first and of a second supply switch valve 27a, 27b. Thereby, the liquid level is determined by means of a liquid level measuring device 21 for each.

A carbon dioxide tank 1d assures the addition of carbon dioxide to the liquid product P being a mixture of the first and the second component k1, k2. The liquid product P containing carbon dioxide is stored in a filling tank 1c which is also equipped with a liquid level measuring device 21. Optionally, only a combination of filling tank and storage tank or only a single tank is equipped with the liquid level measuring device 21.

The storage tanks 1a, 1b are connected with the filling tank 1c via a pressure equalization line 1. Advantageously, the pressure equalization line 1 assures the same pressure in all tanks. This pressure is between 1 and 10 bar and is typically 6 bar. Thus, the storage tanks 1a, 1b, the filling tank 1c and the pressure equalization line 1 form a pressure equalization system. In order to minimize pressure equalization processes, the liquid level in the storage tanks 1a, 1b and in the filling tank 1c is kept substantially constant. If for example a high amount of the component k1 would be withdrawn from the first storage tank 1a without refilling the component k1 via the supply line 27a, an unbalance, like an under-pressure, would arise in the first storage tank 1a because of an increase of the gas space and a change of the liquid level, which would have to be compensated via the pressure equalization line. This would result in a decrease of the pressure in the second storage tank 1b and in the filling tank 1c. Because the liquid product P comprises carbon dioxide the danger would arise that carbon dioxide would escape from the liquid product into the atmosphere of the filling tank 1c because of the lower pressure inside the filling tank 1c, such that the liquid product P would not have a required quality anymore. Thus, pressure fluctuations originating from an extraction of liquid from the storage tanks 1a, 1b and/or the filling tank 1c are limited by the pressure equalization processes to substantially maximum +/−0.2 bar. Because of the substantially constant liquid level in all tanks a pressure drop or a pressure rise respectively is minimized, contributing to a good quality of the liquid product P.

A further possibility to avoid the pressure drop is offered by a preferred embodiment of the system according to the invention, in case of which the carbon dioxide tank 1d is connected with the pressure equalization system via a fourth line 9e having a third switching valve 20, wherein the fourth line 9e is adapted to conduct carbon dioxide into the pressure equalization system when the third switching valve 20 is open.

In a further preferred embodiment of the system 30 according to the invention the pressure drop is counteracted by supplying gas into the pressure equalization system out of an additional gas tank 18 connected to the pressure equalization system by means of a third line 9c having a second switching valve 19. The gas is supplied through the third line 9c when the second switching valve 19 is open. This variant provides a cheap way to regulate the pressure by means of another gas which is e.g. cheaper, like air.

In the opposite case, thus in case of a pressure increase in the pressure equalization system, a fourth switching valve 12 which is attributed to the filling tank 1c, particularly an over-pressure valve, is responsible for reducing the pressure inside the pressure equalization system. In a preferred embodiment of the system 30 according to the invention the fourth switching valve 12 is adapted to serve on the one hand for reducing the pressure and on the other hand for aerating the pressure equalization system.

Pressure data is acquired by means of a pressure sensor 13 which is arranged in the pressure equalization system and which is preferably attributed to the filling tank 1c and which measures an occurring gas pressure inside the pressure equalization system.

In the following, the production of the liquid product P is described taking into account the already explained pressure conditions.

Each storage tank 1a, 1b is connected with a first or a second mass-flow control circuit 2a, 2b, respectively, particularly according to the type disclosed in detail in the patent application EP 0334213 A. The mass-flow control circuits 2a, 2b are shown in the FIGURE by means of the dotted lines. They comprise a first and a second supply device 3a, 3b, preferably a liquid pump, which supply the first or the second component k1, k2, respectively, from the corresponding storage tank 1a, 1b into the corresponding mass-flow control circuit 2a, 2b. Furthermore, the mass-flow control circuits 2a, 2b comprise a first or a second flow meter 4a, 4b respectively for measuring a current mass-flow of the components k1, k2, and a first or a second regulating valve 5a, 5b, respectively, for adjusting the current mass-flow, which are arranged following each other in the supply direction F of the components k1, k2. Further, for each mass-flow control circuit 2a, 2b a first or a second switch arrangement 14a, 14b, respectively, is provided, which on the one hand returns the components k1, k2 into the corresponding storage tank 1a, 1b in case of a deviation of the current mass-flow from the respective target mass-flow and on the other hand feeds the components k1, k2 into a first line 9a at its first end 24a in case of a match of the current mass-flow with the respective target mass-flow. In the described embodiment, the first end 24a of the first line 9a is identical with a connection point 28b of the second mass-flow control circuit 2b with the first line 9a. The first mass-flow control circuit 2a is connected at a position 28a along the first line 9a. In an embodiment not shown here the connections 28a, 28b of both mass-flow control circuits 2a, 2b are identical with the first end 24a of the first line 9a.

In a preferred embodiment of the system 30 according to the invention the switching arrangements 14a, 14b of both mass-flow control circuits 2a, 2b comprise each, a first and a second back-flow switching valve 6a, 6b and a first and a second feed switch valve 7a, 7b. The operation of the switching arrangements 14a, 14b is described by means of the first switching arrangement 14a. In the case that the current mass-flow of the first component k1 deviates from the target mass-flow, the first feed switching valve 7a is closed and the first back-flow switching valve 6a is opened. By this, the component k1 is conducted back into the first mass-flow control circuit 2a and further back into the first storage tank 1a. In the case that the current mass-flow of the first component k1 equals the target mass-flow, the first feed switching valve 7a is opened and the first back-flow switching valve 6a is closed. By this, the first component k1 is conducted into the first line 9a, however only as soon as the current mass-flow of the second component k2 also equals its target mass-flow. In other words, all components k1, k2 are only conducted into the first line 9a as soon as each component k1, k2 has reached its target mass-flow. Preferably, this way of supplying leads to an immediate reaching of a required concentration of the components k1, k2 in the liquid product P as soon as the mixing operation is initiated. By this, a stabilizing of the mixed liquid product P is obsolete. Contrary to this, in known solutions the product has to be disposed of until the stabilization. In the FIGURE, the arrow denoted by P shall clarify that first line 9a contains the liquid product P.

The first line 9a is connected at its first end 24a with a discharge line 9d for discharging an amount of the liquid product P from the filling tank 1c. The discharge line 9d is itself connected with the filling tank 1c, particularly in a bottom section of the filling tank 1c. The first line 9a and the discharge line 9d form together a circulation circuit 8 of the liquid product P.

Furthermore, the first line 9a is connected with a second line 9b for supplying carbon dioxide and is connected at a second end 24b to the filling tank 1c. The carbon dioxide tank 1d is connected with the second line 9b, wherein the second line 9b comprises a third flow meter 4c and a third regulating valve 5c for regulating the carbon dioxide mass-flow supplied into the first line 9a. Particularly, a carbon dioxide mass-flow into the circulation circuit 8 is adjusted by means of the third regulating valve 5c in such a way that the liquid product P keeps a carbon dioxide target value. For example, in case of a typical refreshing beverage around four litres carbon dioxide are added per litre of liquid mixture.

The first line 9a feeds the liquid product P containing carbon dioxide into the filling tank 1c, out of which filling tank 1c non-constant amounts of the liquid product P are withdrawn non-continuously via a filling line 22 and fed into a filling device 25 of the type described at the beginning via a discharge switching valve 23. The transport of the liquid product P through the first line 9a is done by means of a third supply device 17 which is preferably formed as a liquid pump. The third supply device 17 is arranged in the circulation circuit 8 and formed in such a way that it conducts the liquid product P located inside the circulation circuit 8 into a mixing element 16 and further into the filling tank 1c when a first switching valve 10, which is arranged beyond the mixing element 16 seen in supply direction F, is open. The first switching valve 10 additionally has the task of closing the circulation circuit 8 when the system 30 according to the invention is shut down.

The mixing element 16, preferably formed as a static mixing element, improves the mixture of the first and the second component k1, k2 already mixed in the first line 9a with respect to homogeneity. Preferably, the mixing element is arranged as close as possible to the second end 24b of the first line 9a in order to supply a well mixed liquid product P to the filling tank 1c. However, it is possible to arrange the mixing element 16 at an arbitrary location along the first line 9a.

The circulation circuit 8 comprises furthermore a cooling element 15 for cooling the liquid product P which is located along the first line 9a, particularly between the third supply device 17 and the mixing element 16. By means of the cooling element 15 the liquid product P is brought to and kept at a target temperature. The adherence to the target temperature is assured independently from the stop-go operation of the production chain. Advantageously, in case of a positioning of the cooling element 15 upstream of the mixing element 16 with respect to the supply direction, it is reached that the liquid product P the absorption of carbon dioxide of which depends on its temperature and its local turbulence. By this, parameters of the mixing element 16 can be adjusted to an optimum mixing of the liquid product P. The cooling element 15, which is e.g. formed as a plate heat exchanger, may, however, be positioned at another location along the first line 9a. Furthermore one may renounce using the cooling element 15 in certain application environments.

In a preferred embodiment of the system 30 according to the invention the second line 9b is connected to the first line 9a between the third supply device 17 and the cooling element 15. Preferably, in this case the liquid product P contains all required ingredients and it is assured that the cooling and the mixing can be adapted to the end product, without having to put up with a subsequent change of the features of the liquid product P. The connection of the second line 9b to the first line 9a can however be performed at another location of the circulation circuit 8.

After the cooling and mixing the liquid product P ready to be filled is supplied into the filling tank 1c when a circulation switching valve 10 is open.

The filling tank 1c has a control circuit 11 for measuring a density and/or a temperature and/or a carbon dioxide concentration of the liquid product P. From the measurement of the density of the liquid product P it is possible to draw conclusions about the concentration of the components of the liquid product P. Particularly, the density varies strongly with a sugar concentration in the liquid product P. If a deviation of the density is observed, immediately measures against this can be initiated in form of an immediate correction of the concentration. The deviation is corrected by changing the concentration of the first and/or the second component k1, k2 and/or of the carbon dioxide. The liquid product P is circulated in the circulation circuit 8 until the target value of the component in question and/or of the carbon dioxide in the filling tank 1c is reached.

For example, in case of a too low amount of one of the liquid components k1, the switch arrangement 14a of the first mass-flow control circuit 2a of the component k1 is switched to a supply into the first line 9a and thus the concentration of the component k1 is immediately increased.

If an excessive amount of the component k1 is observed, the rest of the components, in this case the second component k2, are supplied into the first line 9a. As the case may be, the carbon dioxide concentration can additionally be changed.

If a too low carbon dioxide concentration is observed, the third regulating valve 5c is post-regulated in order to supply more carbon dioxide into the first line 9a.

In case the carbon dioxide concentration is too high there is on the one hand the possibility to increase the liquid concentration in the first line 9a by supplying the first and the second component k1, k2 in the correct ratio into the first line 9a and on the other hand to decrease the gas pressure of the carbon dioxide in the filling tank 1c by means of the fourth switching valve 12, with the result that carbon dioxide can escape out of the liquid product P located inside the filling tank into the atmosphere of the filling tank 1c.

If the current temperature of the liquid product P does not equal the target temperature, the current temperature is post-regulated by the cooling element 15.

In an active phase of the filling device 25, meaning when the filling device 25 extracts an amount of the liquid product P out of the filling tank, substantially the same amount of the liquid product P is supplied via the first line 9a. At this time the first and the second component k1, k2 are supplied into the first line 9a and the corresponding storage tank 1a, 1b is refilled via the first or the second supply line 26a, 26b, respectively.

In a passive phase of the filling device 25, which may e.g. occur because of a failure of other components of the production chain, a circulation of the liquid product P located in the filling tank 1c and in the first line 9a is kept constant within the circulation circuit 8 by means of the third supply device 17. By this it is assured that on the one hand the liquid product continues keeping the target temperature by repeatedly passing the cooling element 15 and on the other hand that the mixing quality of the liquid product P, which e.g. may decrease substantially in case of an unmoved storage in the filling tank 1c because of an accumulation of fruit juice parts at the bottom of the filling tank 1c, is kept by passing the mixing element.

While preferred embodiments of the invention are described in the present patent application, it is clearly noted that the invention is not limited to these embodiments but can also be carried out in different ways within the scope of the following claims.

List Of Reference Numerals
1=pressure equalization line
1a, 1b=first and second storage tank
1c=filling tank
1d=carbon dioxide tank
2a, 2b=first and second mass-flow control circuit
3a, 3b=first and second supply device
4a, 4b=first and second flow meter
4c=third flow meter
5a, 5b, 5c=first, second and third regulating valve
6a, 6b=first and second back-flow switching valve
7a, 7b=first and second feed switching valve
8=circulation circuit
9a, 9b=first and second line
9c, 9e=third and fourth line
9d=discharge line
10=circulation switching valve
11=control circuit
12=fourth switching valve
13=pressure sensor
14a, 14b=first and second switching arrangement
15=cooling element
16=mixing element
17=third supply device
18=gas tank
19, 20=second and third switching valve
21=liquid level measuring device
22=filling line
23=discharge switching valve
24a, 24b=first and second end of the first line
25=filling device
26a, 26b=first and second supply line
27a, 27b=first and second supply switching valve
28a=position of the connection of the first mass-flow control circuit
28b=connection point of the second mass-flow control circuit
F=supply direction
P=liquid product
30=system

The invention claimed is:

1. A system (30) for continuously producing a liquid product (P) comprising at least two liquid components (k1, k2) that are capable of being pumped, with a first and a second storage tank (1a, 1b) for each component (k1, k2) and a first and a second mass-flow control circuit (2a, 2b) attributed to the first and the second storage tank (1a, 1b), respectively, for establishing a target mass flow of the component (k1, k2), wherein a first and a second supply device (3a, 3b) pumps the component (k1, k2) out of the respective storage tank (1a, 1b) into the respective mass-flow control circuit (2a, 2b), and a first and a second flow meter (4a, 4b), respectively, for measuring a current mass-flow of the component (k1, k2) and a first and a second regulating valve (5a, 5b), respectively, for adjusting the current mass-flow are installed downstream following each other in a supply direction (F) of the component (k1, k2), wherein a switch arrangement (14a, 14b) is provided for each mass-flow control circuit (2a, 2b), which on the one hand returns the component (k1, k2) to the corresponding storage tank (1a, 1b) in case of a deviation of the current mass-flow from the respective target mass-flow and on the other hand feeds the component (k1, k2) into a first line (9a) at a first end (24a) in case of a match of the current mass-flow with the respective target mass-flow, which first line (9a) is connected with a second line (9b) for feeding carbon dioxide and is connected at a second end (24b) with a filling tank (1c), wherein the first line (9a) feeds the liquid product (P) containing carbon dioxide into the filling tank (1c), from which filling tank (1c) non-continuous amounts of the liquid product (P) are withdrawn via a filling line (22), wherein the storage tanks (1a, 1b) and the filling tank (1c) are designed as pressure vessels and are interconnected by means of at least one pressure equalization line (1) for establishing a pressure equalization between the storage tanks (1a, 1b) and the filling tank (1c) and form together with the pressure equalization line (1) a pressure equalization system.

2. The system according to claim 1, wherein a discharge line (9d) for discharging an amount of the liquid product (P) out of the filling tank (1c) connects the first end (24a) of the first line with the filling tank (1c), wherein the first line (9a) and the discharge line (9d) form a circulation circuit (8) of the liquid product (P).

3. The system according to claim 1, wherein a carbon dioxide storage tank (1d) is connected with the second line (9b), wherein the second line (9b) comprises a third flow meter (4c) and a third regulating valve (5c) for controlling the mass-flow of carbon dioxide fed into the first line (9a).

4. The system according to claim 2, wherein a third supply device (17) is arranged in the circulation circuit (8), which is adapted to direct the liquid product (P) located in the circulation circuit (8) into a mixing element (16), and further into the filling tank (1c) in case of an open position of a first switching valve (10) arranged beyond the mixing element (16) in the supply direction (F).

5. The system according to claim 4, wherein a cooling element (15) for cooling the liquid product (P) is provided in the circulation circuit (8), being located along the first line (9a).

6. The system according to claim 5, wherein the second line (9b) is connected with the first line (9a) between the third supply device (17) and the cooling element (15).

7. The system according to claim 3, wherein the carbon dioxide storage tank (1d) is connected with the pressure equalization system by means of a fourth line (9e) which has a third switching valve (20), wherein the fourth line (9e) is adapted to supply carbon dioxide into the pressure equalization system when the third switching valve (20) is in open position.

8. The system according to claim 1, wherein a gas tank (18) is connected with the pressure equalization system by means of a third line (9c) having a second switching valve (19), wherein the third line (9c) is adapted to supply gas from the gas tank (18) into the pressure equalization system when the second switching valve (19) is in open position.

9. The system according to claim 1, wherein the filling tank (1c) has a fourth switching valve (12), for reducing the pressure inside it.

10. The system according to claim 1, wherein the filling tank ($1c$) has a control circuit (11) for measuring a density and/or a temperature and/or a carbon dioxide concentration of the liquid product (P).

11. The system according to claim 1, wherein the filling tank ($1c$) and/or the first storage tank ($1a$) and/or the second storage tank ($1b$) has a liquid level measuring device (21).

12. A method for continuously producing a liquid product (P) comprising at least two components ($k1$, $k2$) and carbon dioxide by using a system of the invention according to claim 1, wherein a continuous pressure equalization is carried out during the operation of the system (30) between the storage tanks ($1a$, $1b$) and the filling tank ($1c$) by means of the pressure equalization line (1).

13. The method according to claim 12, wherein a mass-flow of the carbon dioxide into the circulation circuit (8) is adjusted by a third regulating valve ($5c$) in such a way that the liquid product (P) keeps a carbon dioxide target value.

14. The method according to claim 12, wherein a liquid level in the storage tanks ($1a$, $1b$) and in the filling tank ($1c$) is kept substantially constant.

15. The method according to claim 12, wherein the gas pressure in the pressure equalization system is increased by opening a third switching valve (20).

16. The method according to claim 12, wherein a circulation of the liquid product (P) in the circulation circuit (8) is kept constant by means of a third supply device (17).

17. The method according to claim 12, wherein the liquid product (P) is kept at a target temperature by means of a cooling element (15).

18. The method according to claim 12, wherein the liquid product (P) is mixed by means of a mixing element (16).

\* \* \* \* \*